(12) United States Patent
Lauder

(10) Patent No.: US 8,843,359 B2
(45) Date of Patent: Sep. 23, 2014

(54) LANGUAGE TRANSLATION EMPLOYING A COMBINATION OF MACHINE AND HUMAN TRANSLATIONS

(76) Inventor: Andrew Nelthropp Lauder, San Jose, CA (US)

( * ) Notice: Subject to any disclaimer, the term of this patent is extended or adjusted under 35 U.S.C. 154(b) by 938 days.

(21) Appl. No.: 12/660,652

(22) Filed: Mar. 1, 2010

(65) Prior Publication Data

US 2010/0223048 A1   Sep. 2, 2010

Related U.S. Application Data

(60) Provisional application No. 61/156,244, filed on Feb. 27, 2009.

(51) Int. Cl.
*G06F 17/28* (2006.01)

(52) U.S. Cl.
USPC .................................. 704/4; 704/2; 704/270

(58) Field of Classification Search
None
See application file for complete search history.

(56) References Cited

U.S. PATENT DOCUMENTS

| | | | | |
|---|---|---|---|---|
| 7,369,998 | B2 * | 5/2008 | Sarich et al. | 704/277 |
| 7,991,607 | B2 * | 8/2011 | Zhang et al. | 704/2 |
| 8,060,359 | B2 * | 11/2011 | Kimura | 704/4 |
| 8,145,472 | B2 * | 3/2012 | Shore et al. | 704/2 |
| 8,185,375 | B1 * | 5/2012 | Kumar et al. | 704/4 |
| 2003/0149557 | A1 * | 8/2003 | Cox et al. | 704/2 |
| 2004/0098248 | A1 * | 5/2004 | Otani | 704/8 |
| 2005/0086051 | A1 * | 4/2005 | Brulle-Drews | 704/7 |
| 2006/0293893 | A1 * | 12/2006 | Horvitz | 704/251 |
| 2007/0005363 | A1 * | 1/2007 | Cucerzan et al. | 704/256 |
| 2007/0100601 | A1 * | 5/2007 | Kimura | 704/4 |
| 2007/0136470 | A1 * | 6/2007 | Chikkareddy et al. | 709/226 |
| 2010/0004919 | A1 * | 1/2010 | Macherey et al. | 704/4 |
| 2010/0004920 | A1 * | 1/2010 | Macherey et al. | 704/4 |
| 2010/0030549 | A1 * | 2/2010 | Lee et al. | 704/4 |
| 2010/0223048 | A1 * | 9/2010 | Lauder | 704/4 |

* cited by examiner

*Primary Examiner* — Justin Rider

(57) ABSTRACT

A computer-implemented method of translating text from a source language to a target language includes the steps of (a) detecting a source language on a first communication device, (b) detecting a location of the first communication device, (c) determining the target language based upon the detected location of the first communication device, (d) receiving an input for translation from the first communication device, (e) displaying a list of popular source phrases that are similar to the received input on the first communication device, (f) translating a user selected similar popular source phrase if the user selects the similar popular source phrase, else translating the input by means of a machine translation engine, and (g) displaying the translation output of the user selected similar popular source phrase if the user selected the similar popular source phrase, else determining if the translation output from the machine translation engine has been approved by a human translator, submitting the translation output from the machine translation engine to a human translator and displaying the translation output from the machine translation engine together with a measure of the accuracy of the translation output from the machine translation engine.

20 Claims, 7 Drawing Sheets

LANGUAGE TRANSLATION EMPLOYING A COMBINATION OF MACHINE AND HUMAN TRANSLATIONS

CROSS REFERENCE TO RELATED APPLICATION

The present invention claims priority from provisional patent application Ser. No. 61/156,244 filed on Feb. 27, 2009 entitled "System, Method and Article of Manufacture for Providing a Mobile Device Translation Service", the entire disclosure of which is incorporated herein by reference.

BACKGROUND OF THE INVENTION

The present invention relates generally to language translation systems and more particularly to a system, computer-implemented method and article of manufacture that provides language translation and employs a combination of machine and human translations.

Machine language translation systems are well known in the art and provide translation of a limited number of languages based upon information stored in a database. The information includes words, phrases and sentences in a source language and corresponding translated words, phrases and sentences in a target language. As the database is populated with words, phrases and sentences derived from dictionaries and translation algorithms, the information stored in the database is not always accurate or up to date. Nor does the information include all the words, phrases and sentences commonly used in the source and target languages. Furthermore, the information typically does not include the variation that characterizes dialects of a same language spoken in different geographical locations.

To provide for a language translation system that is more robust, some machine language translation systems include a means by which a user can contribute a translation of a word, phrase or sentence. A machine language translation system having this feature is Google Translate (translate.google.com). While user submitted translations can provide a translation of a word, phrase or sentence not previously found in the database or provide an alternative translation for an existing translation, the accuracy of the user submitted translation is not verified by the machine language translation system or by the users of the system.

A human-based language translation system that features user ratings of translated phrases is described in U.S. Patent Application Publication No. 2009/0198487 A1 entitled "Community Translation on a Social Network". Text phrases including content from social networking objects are translated by members of the social network and stored in a translated phrases store. Within the social network, community translations of text phrases include ratings that indicate the perceived quality of the translated phrases by members of the social network. Ratings may be used for determining which translated phrases to display when a translation of a source phrase is requested. Members can vote on the quality of translated phrases submitted by other members and a weight of a member's vote may indicate the voter's credibility and be based on the voter's translation ability as determined by votes received on the voter's translations. The described method does not employ machine translation and relies solely upon member translations of text phrases used within the social network.

SUMMARY OF THE INVENTION

The limitations of prior art language translation systems are addressed by embodiments of the invention that combine machine and human translations to provide a language translation system that is accurate, up to date and location based.

In accordance with an embodiment of the invention, a computer-implemented method of translating text from a source language to a target language comprising the steps of (a) detecting a source language on a first communication device, (b) detecting a location of the first communication device, (c) determining the target language based upon the detected location of the first communication device, (d) receiving an input for translation from the first communication device, (e) displaying a list of popular source phrases that are similar to the received input on the first communication device, (f) translating a user selected similar popular source phrase if the user selects the similar popular source phrase, else translating the input by means of a machine translation engine, and (g) displaying the translation output of the user selected similar popular source phrase if the user selected the similar popular source phrase, else determining if the translation output from the machine translation engine has been approved by a human translator, submitting the translation output from the machine translation engine to a human translator and displaying the translation output from the machine translation engine together with a measure of the accuracy of the translation output from the machine translation engine.

In accordance with another aspect of the invention, detecting the location of the first communication device comprises detecting a GPS signal In accordance with another aspect of the invention, detecting the location of the first communication device comprises detecting an Internet Protocol address.

In accordance with another aspect of the invention, receiving the input for translation from the first communication device comprises receiving an audio input.

In accordance with another aspect of the invention, receiving the input for translation from the first communication device comprises receiving a text input.

In accordance with another aspect of the invention, receiving the input for translation from the first communication device comprises receiving an image input.

In accordance with another aspect of the invention, translating the user selected similar popular source phrase comprises searching a database phrasebook for a translation output corresponding to the selected similar popular source phrase.

In accordance with another aspect of the invention, a context for the translation input is requested from the user.

In accordance with another aspect of the invention, the translation output is sent to a second communication device.

In accordance with another aspect of the invention, the translation output is provided as an audio signal.

In accordance with another aspect of the invention, the translation output is provided as an SMS/MMS message.

In accordance with another aspect of the invention, the translation output is provided as an email message.

In accordance with another aspect of the invention, the translation output is provided as an IM message.

In accordance with another aspect of the invention, the translation output is played on the first communication device as an audio output.

In accordance with another aspect of the invention, the translation output is displayed on the first communication device as an image output.

In accordance with another aspect of the invention, a user suggested translation of the input is received and distributed to a human translator, and translation suggestions and ratings from the human translator are provided to a moderator sorted by the ratings.

In accordance with another aspect of the invention, approval from the moderator of the user suggested translation is received and a notification of the moderator approval is sent to the first communication device and added to the machine translation engine and a database phrasebook.

In accordance with another aspect of the invention, the translation output from the machine translation engine is distributed to a human translator and translation suggestions and ratings from the human translator are provided to a moderator sorted by the ratings.

In accordance with another aspect of the invention, the approval from the moderator of the translation output is received and a notification of the moderator approval sent to the first communication device and the approved translation output is added to the machine translation engine and to a database phrasebook.

In accordance with another aspect of the invention, additional suggestions from the human translator are requested in the case where the moderator does not approve the received translation suggestions.

The figures show embodiments of the invention for illustration purposes only. Those skilled in the art will recognize that other embodiments of the systems and methods described herein may be employed without departing from the principles of the invention.

DETAILED DESCRIPTION OF THE PREFERRED EMBODIMENT

Figure 1:
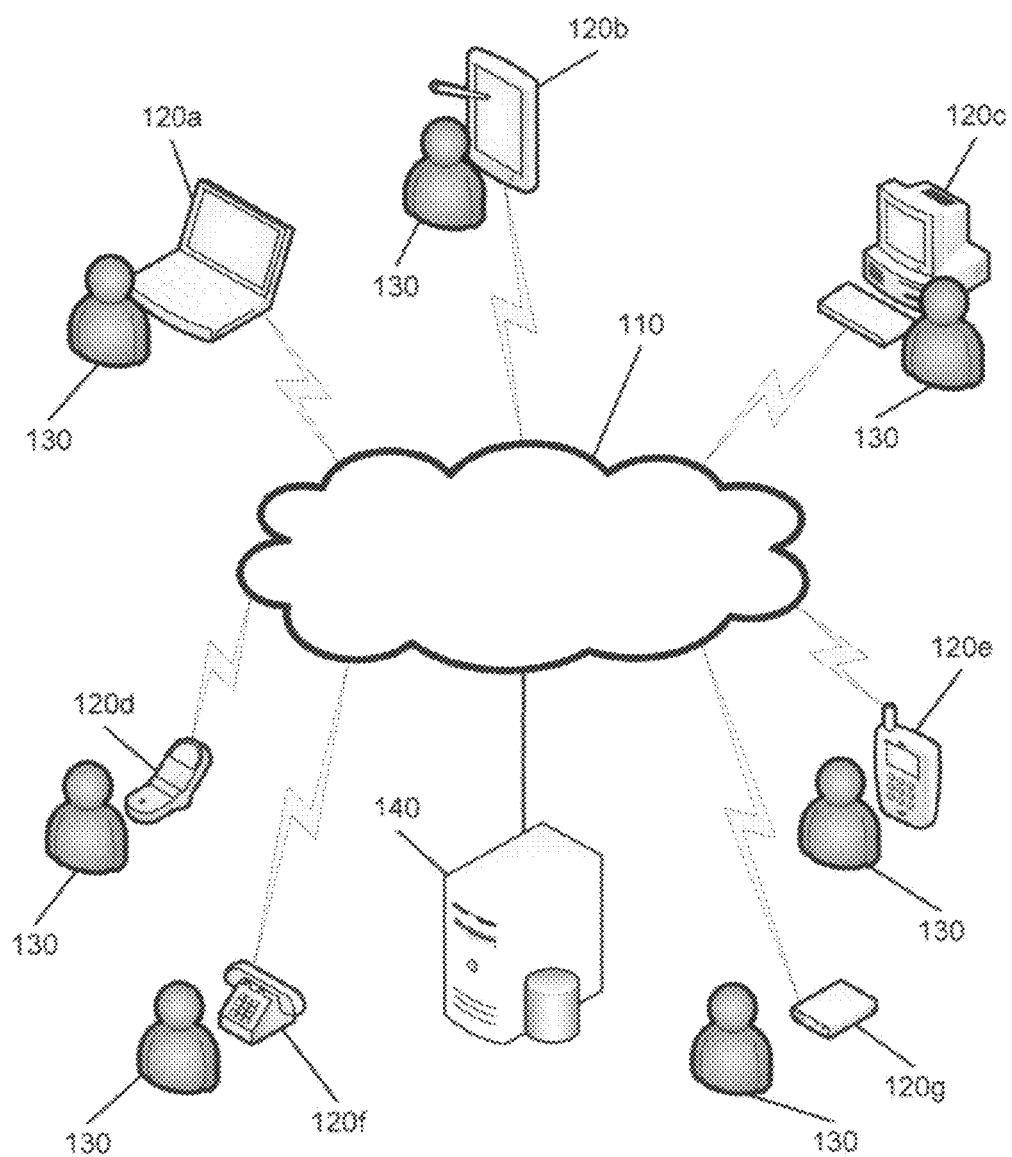
FIG. 1 is a schematic representation showing a networked environment configured for operation of a language translation system employing a combination of machine and human translations in accordance with an embodiment of the invention.

The language translation system and method employing a combination of machine and human translations may be implemented in a networked environment such as shown in FIG. 1. A server machine 140 is operatively coupled to a communications network 110. The communications network 110 is a multi-layered network capable of connecting users 130 desiring translations. The server machine 140 includes components and functionality to communicate with a plurality of communication devices 120a-120g through the communications network 110 and to provide language translation services as further described herein.

The plurality of communication devices 120a-120g are operatively coupled to the communications network 110 and include laptop computers 120a, tablet computers 120b, desktop computers 120c, mobile phones 120d, smart phones 120e, POTS telephones 120f and modems 120g. By means of the plurality of communication devices 120a-120g, users 130 may communicate with the server machine 140 to request a translation, receive a translation, suggest a translation and rate a translation.

Figure 2:
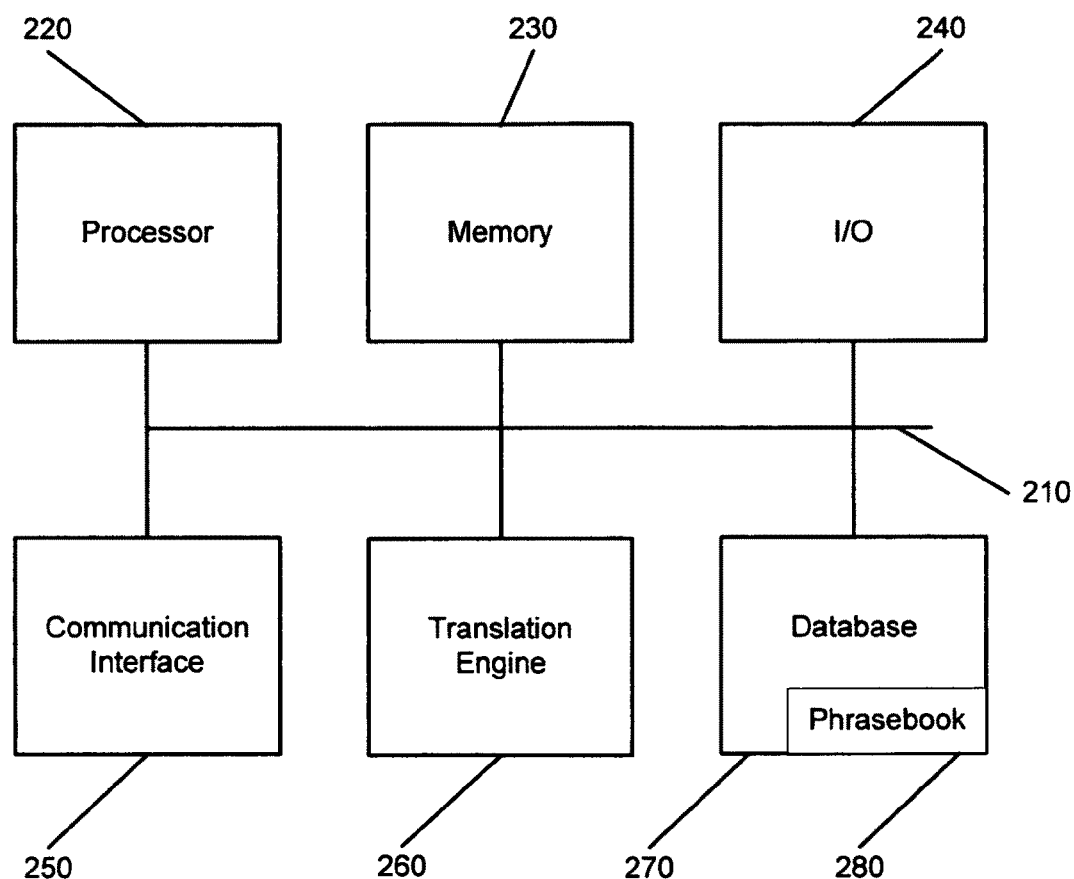
FIG. 2 is a block diagram showing a device configured for operation of the language translation system in accordance with an embodiment of the invention.
Figure 3:
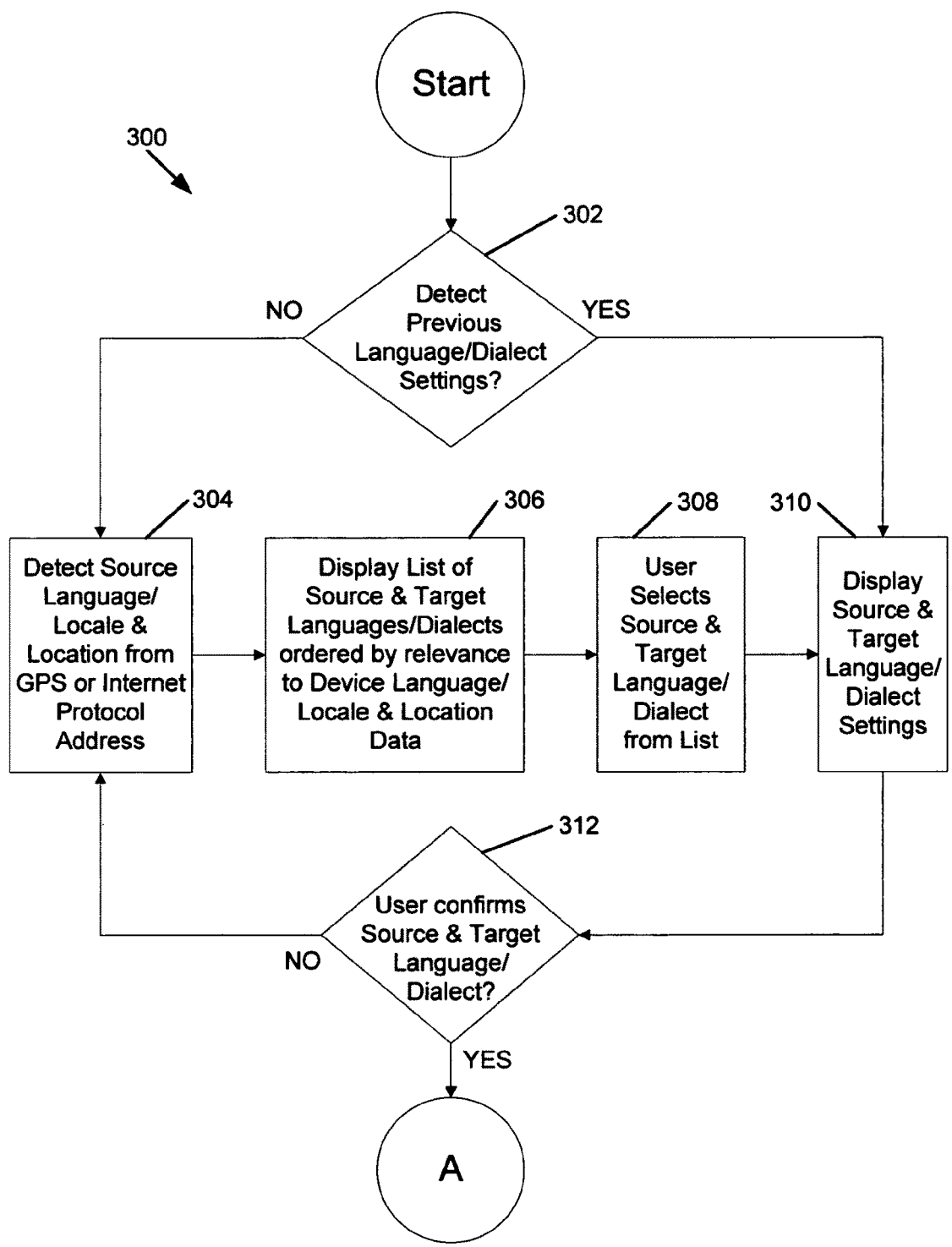
FIGS. 3-7 are flow charts illustrating a method in accordance with an embodiment of the invention.
Figure 4:
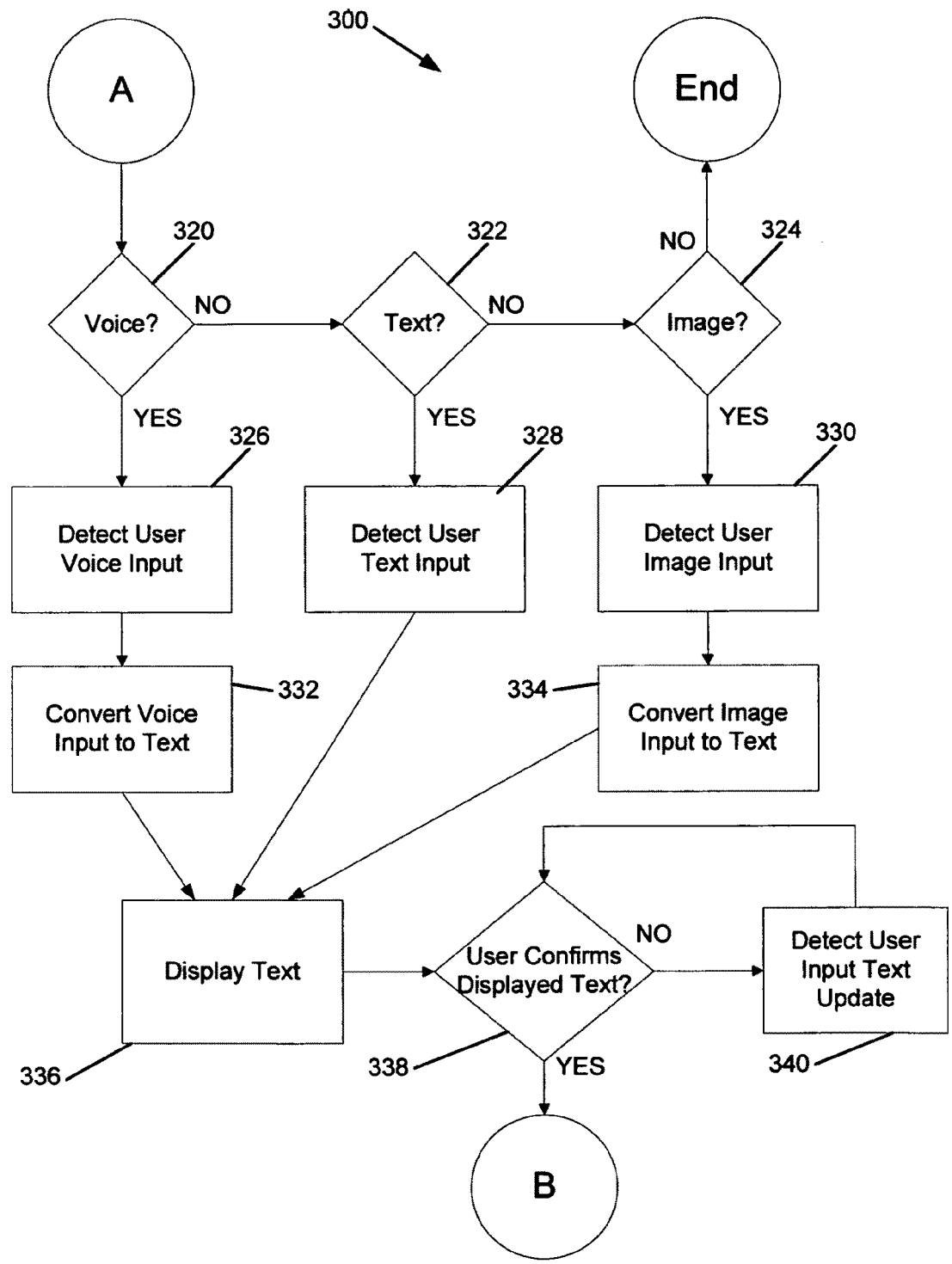
Figure 5:
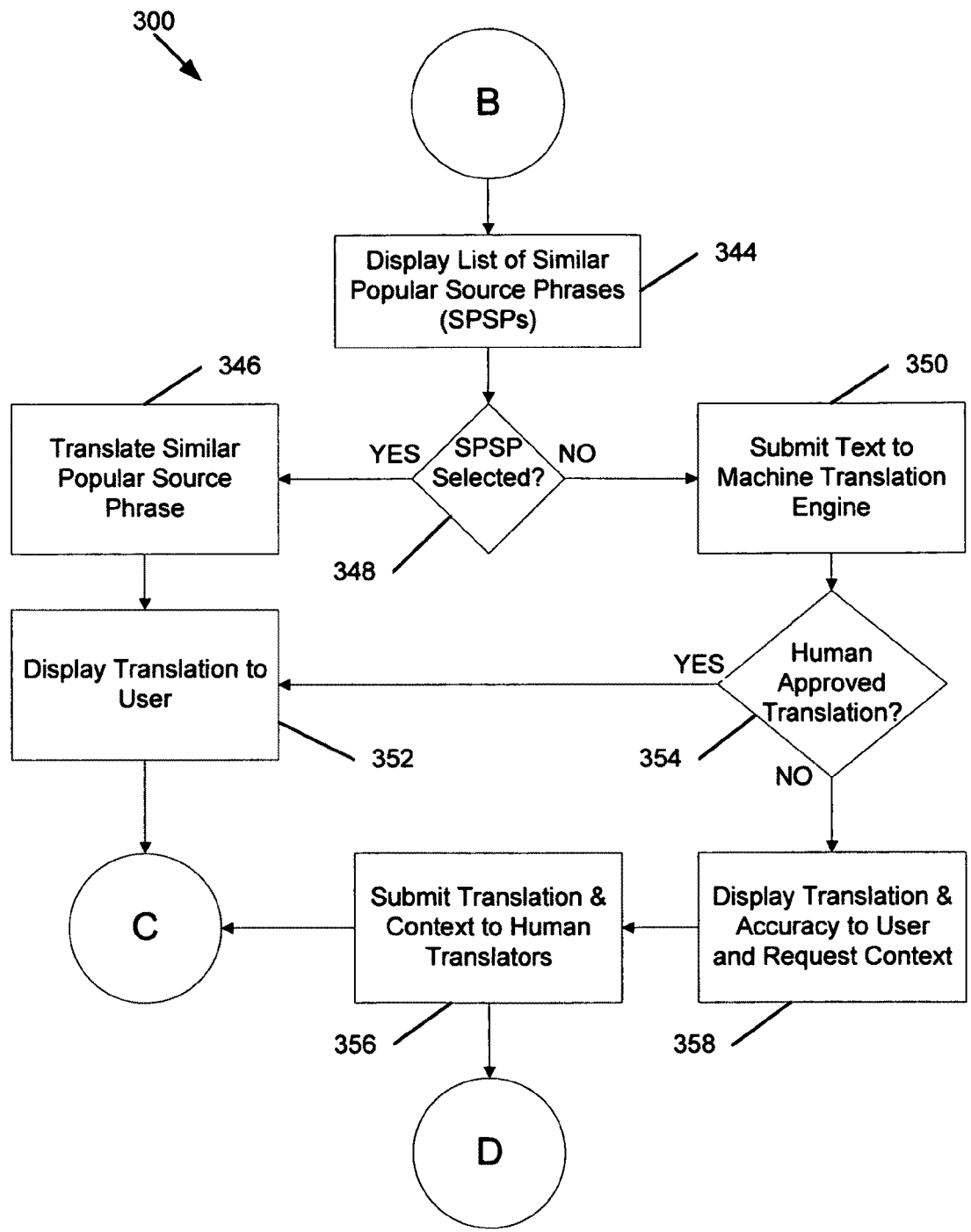
Figure 6:
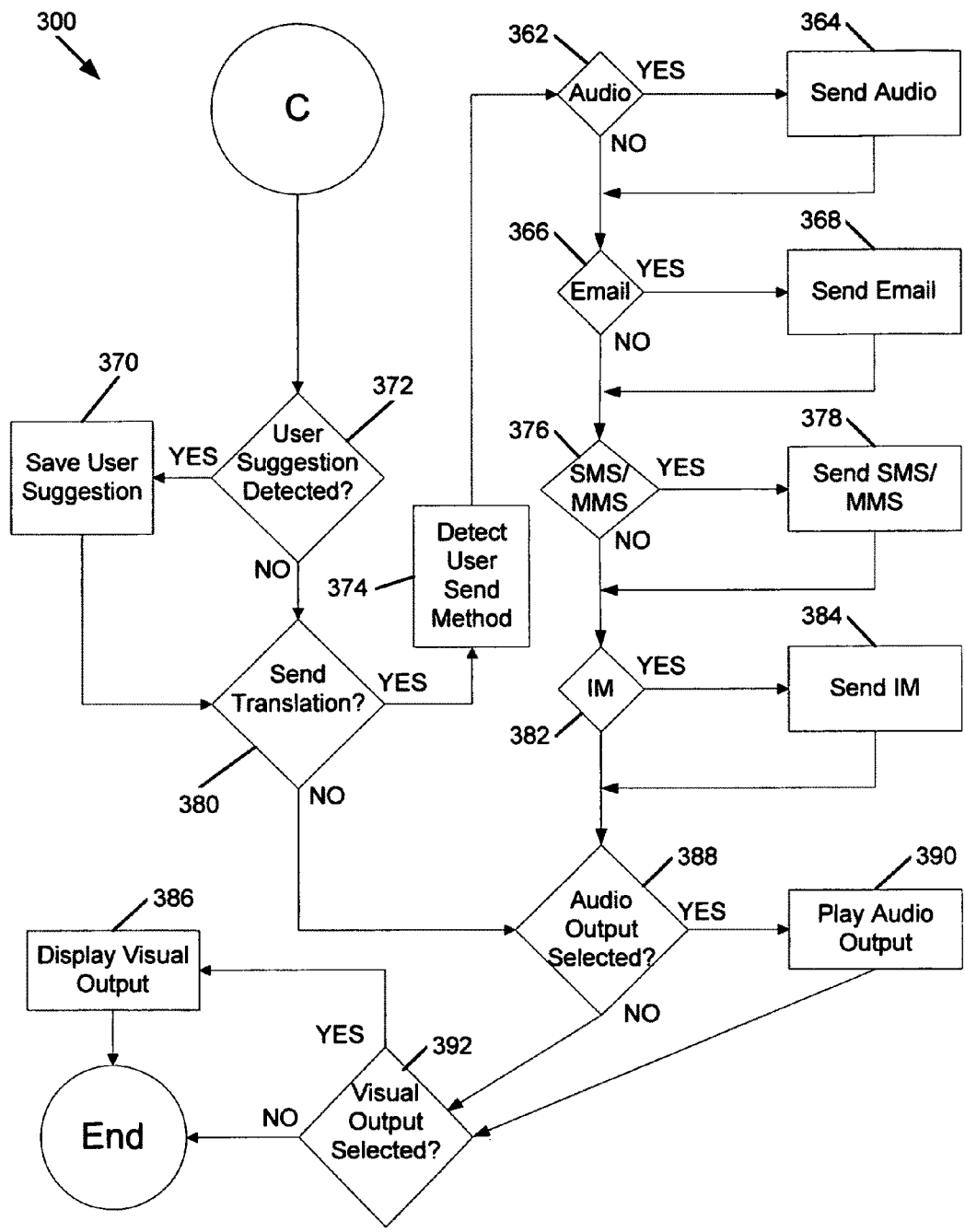
Figure 7:
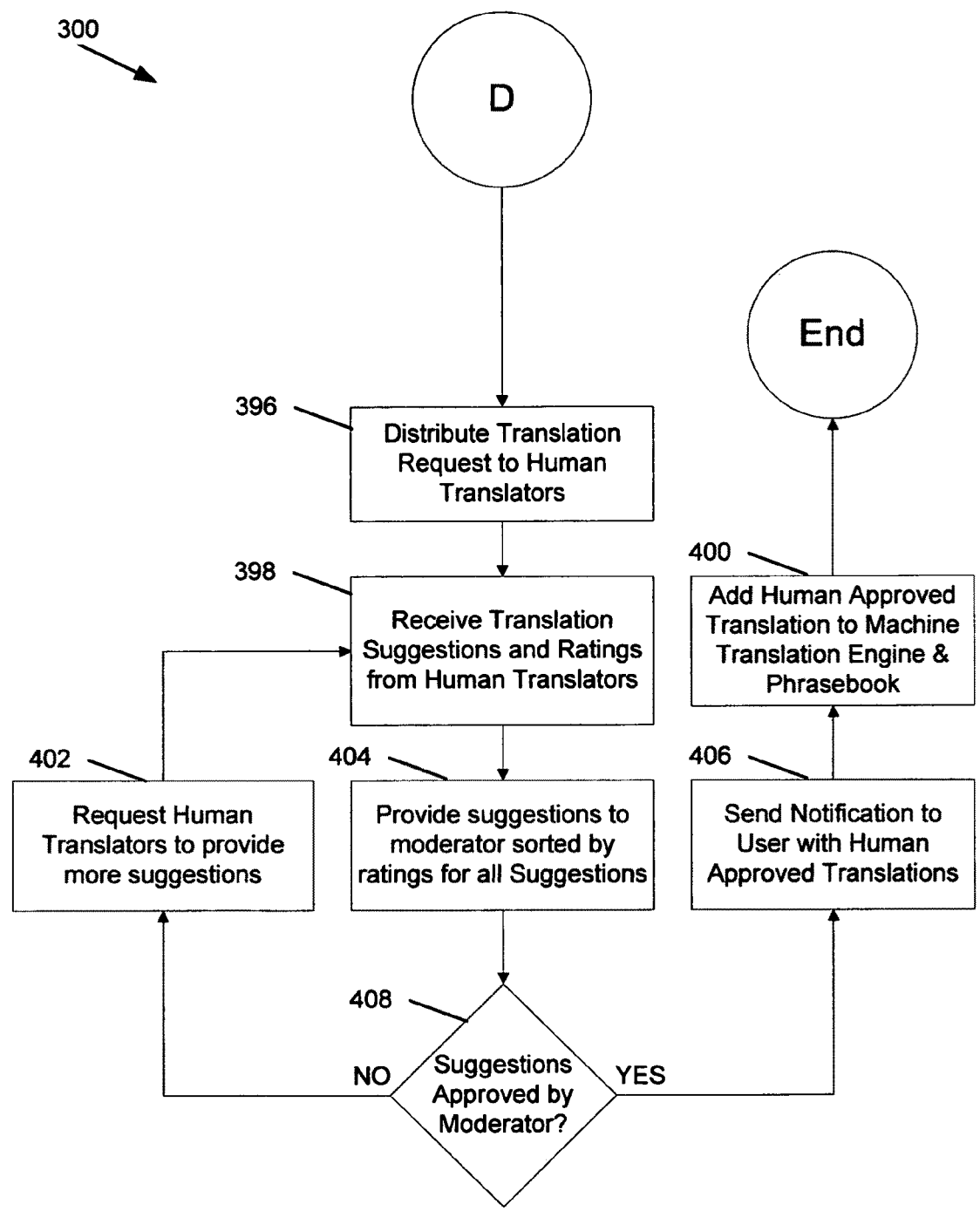

With reference to FIG. 2, communication devices 120a-120e and the server machine 140 include a processor 220, a memory 230, input/output (I/O) components 240, and a communication interface 250. The components are operatively coupled by means of a bus 210. The server machine 140 further includes a translation engine 260 and a database 270 having a phrasebook 280. In an alternate embodiment, communication devices 120a-120e may include the translation engine 260 and the database 270 having the phrasebook 280 so that a user 130 can access the language translation system of the invention when the communications network 110 is not available.

A portion of memory 230 is designated as addressable memory for program execution, while another portion of memory 230 is reserved for storage. Memory 230 may further include an operating system, application programs as well as an object store (not shown). During operation, the operating system is preferably executed by processor 220 from memory 230. The operating system is preferably designed for mobile devices and implements database features that can be utilized by applications through a set of exposed application programming interfaces and methods. The objects in the object store are maintained by applications and the operating system, at least partially in response to calls to the exposed application programming interfaces and methods.

Communication interface 250 may include devices and programs that enable the mobile devices 120 to send and receive information. These devices include wired and wireless modems, satellite receivers and broadcast tuners. The mobile devices 200 may also be directly connected to a computer to exchange data therewith.

Input/output components 240 include a variety of input devices such as a touch-sensitive screen, buttons, rollers, and a microphone as well as a variety of output devices including an audio generator, a vibrating device, and a display.

The translation engine 260 is operable to receive and process input text words, phrases and sentences and to output a text translation of the input text. The translation engine 260 receives updates in the form of translation suggestions from human translators to provide increasingly accurate and up to date translations tailored to the location of the user 130. Operations performed by the translation engine 260 may be performed or implemented with one or more hardware or software modules, alone or in combination with other components of the server machine 140 and communication devices 120a-120e.

The invention will now be described with reference to FIGS. 3-7 which show steps of a computer-implemented method 300 that implements the features of the invention. The method 300 first detects 302 whether source and target languages/dialects have previously been stored on the communication device 120a-120e. If previously stored source and target languages/dialects are detected, then the previous source and target languages/dialects are displayed 310 to the user 130. If no source and target languages/dialects are detected, then a source language/locale and location derived from a GPS signal or Internet Protocol address is detected 304. Device settings generally provide the source language/locale. Examples of source language/locale include English/US, English/UK, Spanish/Spain, Spanish/Mexico and so on.

Following detection of the source language/locale and location a list of source and target languages/dialects is displayed 306 to the user 130. The list is ordered by relevance to the device language/locale and location data. For example, if the detected device language/locale is English/US and the location of the device 120a-120e is Mexico, then the list could include English and Spanish, English and Zapotec, English and Nahuatl and so on as the source and target languages/dialects respectively. The target languages/dialects displayed are the languages most commonly used in the location of the user. The user 130 then selects 308 the source and target languages/dialects from the list and the user selection is displayed 310 to the user 130. The user 130 next confirms 312 the selection or the displayed previous language/dialect settings.

The invention provides user input of translation requests, updates, and translation suggestions in the form of voice, text and image input. A determination is made 320, 322, and 324 if the input is voice, text or image respectively. If the input is voice, then the input is detected 326, converted 332 to text and displayed 336 to the user 130. If the input is text, then the input is detected 328 and displayed 336 to the user 130. If the input is an image, then the input is detected 330, converted to text 334 and displayed 336 to the user 130. The user 130 may then confirm 338 the displayed text. If the user 130 does not confirm the displayed text, then user input text update is detected 340 and user confirmation acquired 338.

A list of Similar Popular Source Phrases (SPSPs) is then displayed 344. SPSPs are stored in the phrasebook 280 and include words, phrases and sentences the translations of which have been approved by a human translator. SPSPs and translations thereof are stored in the phrasebook 280 in a one-to-one relationship. SPSPs and their translations therefore provide translations in the target language/dialect that are accurate, up to date and reflect the target language/dialect spoken in the location of the user 130.

The user 130 may select 348 a SPSP and if he does, then the selected SPSP is translated 346 by searching the phrasebook 280 and the translated text displayed 352 to the user 130. If the user 130 does not select at SPSP, then the text is submitted 350 to the machine translation engine 260 for translation. A determination 354 is then made whether the translated text has been previously approved by a human translator. Human translators in accordance with the invention include users 130 and translators compensated for their translation services. Human translators are ranked in relation to the number of translations submitted, the accuracy of the translations submitted and the nature of the languages/dialects in which the human translator is knowledgeable.

If the translated text has been previously approved by a human translator, then the translation is displayed 352 to the user. If not, then the translated text is displayed 358 to the user 130 with a measure of the accuracy of the translation and a request for the context of the input text. The translated text and user-supplied context is then submitted 356 to a human translator.

Following the display of the translated text to the user 130, the user 130 may suggest an alternate translation. If a user suggestion is detected 372, then the user suggestion is saved 370 and a determination is made 380 whether the translated text is to be sent through the communications network 110 to another communication device 120a-120g. In the case where no user suggestion is detected 372, the determination 380 is made. If it is determined that the translated text is to be sent, then a user send method is detected 374. If the user send method is an audio output 362, then an audio signal of the translated text is sent 364. If the user send method is email 366, then an email is sent 368. If the user send method is SMS/MMS 376, then a SMS/MMS message is sent 378. If the user send method is IM 382, then an IM message is sent 384.

If it is determined 380 that the translated text is not to be sent to another communication device 120a-120g, then a determination is made 388 whether the translated text is to be output on the user's communication device 120a-120e as an audio output. If it is determined that the translated text is to be output on the user's communication device as an audio output, then the audio output is played 390 on the user's communication device. Otherwise a determination is made 392 whether the translated text is to be output as a visual output. If it is determined that the translated text is to be output as a visual output, then the translated text is output as a visual output 392 on the user's communication device. Otherwise, the method 300 ends.

Translated text that has not been approved by a human translator and user suggestions of translations saved in step 370 are distributed 396 to a human translator or to a group of human translators for translation. Translation suggestions and ratings are received 398 from the human translator or group of human translators and provided 404 to a moderator sorted by ratings. The moderator preferably has knowledge of the source and target languages/dialects and either approves or does not approve 408 a translation suggestion. If the translation suggestion is approved by the moderator, then a notification including the human approved translation is sent 406 to the user 130 who requested the translation. The human approved translation is also added 400 to the phrasebook 280 as a SPSP and to the machine translation engine 260.

If the translation suggestion is not approved by the moderator, then the human translators are requested 402 to provide more translation suggestions. Additional translation suggestions are received 398 and provided 404 to the moderator.

The method 300 of the invention provides an end-to-end translation facility between two communication devices 120a-120g. The user 130 may provide a voice, text or image input in a source language/dialect on his communication device and be provided with a translation in a target language/dialect that the user 130 can send to another user 130. Alternatively, the translated text can be output to the user's communication device for local use, as when the user 130 is communicating with another person locally.

The translation engine 260 and the database 270 having the phrasebook 280 may be disposed in the server machine 140 or distributed in a plurality of computing machines. The communication devices 120a-120e may include the translation engine 260 and the database 270 having the phrasebook 280 so that the user 130 can access the language translation system of the invention when the communications network 110 is not available By combining machine and human translations, the present invention provides a translation facility including a phrasebook that grows with use. As the number of Similar Popular Source Phrases increases, reliance upon both machine translations and human translations is reduced to provide accurate and up to date translations in an efficient manner.

The present invention also provides translations from and to languages/dialects that are not available using machine translators. By employing human translators that are fluent in languages not available for translation by machine translators, the system and method of the invention is not limited to major languages.

By determining the location of the user 130, the target languages/dialects displayed are the languages/dialects most commonly used in the location of the user. This feature provides for a level of specificity not provided by prior art machine translators.

The invention has been described in terms of a method including various steps and operations. In another embodiment of the invention, a computer program product includes a computer-readable medium containing computer program code which can be executed by a computer processor. Execution of the computer program code performs any or all of the steps and operations of the described method. Further, in another embodiment of the invention, an apparatus and/or system may be configured to execute the computer program code. Finally, in another embodiment of the invention, a computer data signal embodied in a carrier wave or other tangible medium may include any embodiment of the computer program product or other data combination described herein.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A computer-implemented method of translating text from a source language to a target language comprising the steps of:
   (a) detecting a source language on a first communication device;
   (b) detecting a location of the first communication device;
   (c) determining the target language based upon the detected location of the first communication device;
   (d) receiving an input for translation from the first communication device;
   (e) displaying a list of popular source phrases that are similar to the received input on the first communication device;
   (f) translating a user selected similar popular source phrase if the user selects the similar popular source phrase, else translating the input by means of a machine translation engine; and
   (g) displaying the translation output of the user selected similar popular source phrase if the user selected the similar popular source phrase, else determining if the translation output from the machine translation engine has been approved by a human translator, submitting the translation output from the machine translation engine to a human translator and displaying the translation output from the machine translation engine together with a measure of the accuracy of the translation output from the machine translation engine.

2. The method of claim 1, wherein detecting the location of the first communication device comprises detecting a GPS signal.

3. The method of claim 1, wherein detecting the location of the first communication device comprises detecting an Internet Protocol address.

4. The method of claim 1, wherein receiving the input for translation from the first communication device comprises receiving an audio input.

5. The method of claim 1, wherein receiving the input for translation from the first communication device comprises receiving a text input.

6. The method of claim 1, wherein receiving the input for translation from the first communication device comprises receiving an image input.

7. The method of claim 1, wherein translating the user selected similar popular source phrase comprises searching a database phrasebook for the translation output corresponding to the selected similar popular source phrase.

8. The method of claim 1, further comprising requesting a context for the input from the user.

9. The method of claim 1, wherein the translation output is sent to a second communication device.

10. The method of claim 9, wherein the translation output is sent as an audio signal.

11. The method of claim 9, wherein the translation output is sent as an email message.

12. The method of claim 9, wherein the translation output is sent as an SMS/MMS message.

13. The method of claim 9, wherein the translation output is sent as an IM message.

14. The method of claim 1, wherein the translation output is played on the first communication device as an audio output.

15. The method of claim 1, wherein the translation output is displayed on the first communication device.

16. The method of claim 1, further comprising receiving a user suggested translation of the input and distributing the user suggested translation to a human translator, receiving translation suggestions and ratings from the human translator, and providing the received translation suggestions to a moderator sorted by the ratings.

17. The method of claim 16, further comprising receiving approval from the moderator of the user suggested translation, sending a notification of the moderator approval to the first communication device and adding the approved user suggested translation to the machine translation engine and a database phrasebook.

18. The method of claim 1, further comprising distributing the translation output from the machine translation engine to a human translator, receiving translation suggestions and ratings from the human translator, and providing the received translation suggestions to a moderator sorted by the ratings.

19. The method of claim 18, further comprising receiving approval from the moderator of the translation output, sending a notification of the moderator approval to the first communication device and adding the approved translation output to the machine translation engine and a database phrasebook.

20. The method of claim 18, further comprising requesting additional suggestions from the human translator in the case where the moderator does not approve the received translation suggestions.

* * * * *